United States Patent [19]

Ideguchi et al.

[11] Patent Number: 5,529,732
[45] Date of Patent: Jun. 25, 1996

[54] UNDERLYING BOARDS FOR FIRING AND A METHOD FOR FIRING CERAMIC MOLDINGS BY USING SUCH UNDERLYING BOARDS

[75] Inventors: Yoshiaki Ideguchi; Kyosuke Tsunekawa, both of Nagoya; Norio Kato, Seto, all of Japan

[73] Assignee: NGK Insulators, Ltd., Japan

[21] Appl. No.: 302,917

[22] PCT Filed: Jan. 31, 1994

[86] PCT No.: PCT/JP94/00129

§ 371 Date: Sep. 12, 1994

§ 102(e) Date: Sep. 12, 1994

[87] PCT Pub. No.: WO94/17972

PCT Pub. Date: Aug. 18, 1994

[30] Foreign Application Priority Data

Feb. 2, 1993 [JP] Japan ........................... 5-15453

[51] Int. Cl.⁶ .............................. F27D 5/00; C04B 35/03
[52] U.S. Cl. .................. 264/57; 432/258; 432/259; 501/112; 501/119
[58] Field of Search .................. 264/57; 432/258, 432/259; 501/112, 119

[56] References Cited

U.S. PATENT DOCUMENTS

| | | | |
|---|---|---|---|
| 3,954,672 | 5/1976 | Somers et al. | 252/455 R |
| 4,295,892 | 10/1981 | Matsuhisa et al. | 501/120 |
| 4,598,054 | 7/1986 | Mochida et al. | 501/112 |
| 4,786,542 | 11/1988 | Yasuda et al. | 428/116 |

FOREIGN PATENT DOCUMENTS

| | | |
|---|---|---|
| 2347321 | 11/1977 | France. |
| 2612511 | 9/1988 | France. |
| 3-65568 | 3/1991 | Japan. |
| 5-51262 | 3/1993 | Japan. |
| 5-85834 | 4/1993 | Japan. |
| 5-139849 | 6/1993 | Japan. |

*Primary Examiner*—Christopher A. Fiorilla
*Attorney, Agent, or Firm*—Parkhurst, Wendel & Burr

[57] ABSTRACT

A firing underlying board having a long use life free from thermal expansion and which does not cause twisting of ribs, deformation of an end face, color change or cracking in a honeycomb structural body fired on the underlying board. The firing underlying board is composed mainly of 55–85 wt % of cordierite and 15–45 wt % of mullite. The firing underlying board is used to fire green ceramic honeycomb structural bodies placed thereon.

6 Claims, 2 Drawing Sheets

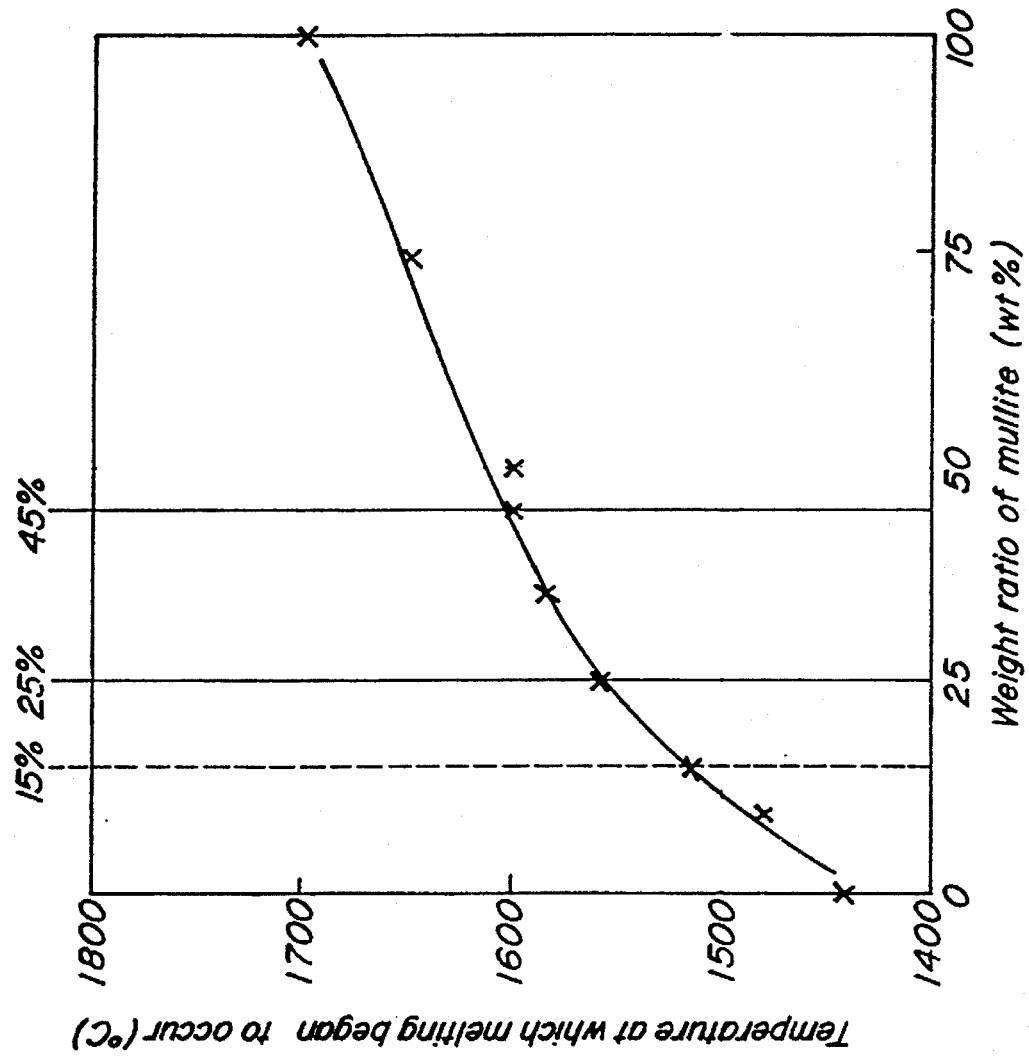

UNDERLYING BOARDS FOR FIRING AND A METHOD FOR FIRING CERAMIC MOLDINGS BY USING SUCH UNDERLYING BOARDS

TECHNICAL FIELD

The present invention relates to underlying boards particularly suitable for firing ceramics and a method for firing ceramic moldings by using such underlying boards.

BACKGROUND ART

It heretofore has been a common practice that when, for example, green ceramic honeycomb structural bodies are to be fired, the structural bodies are fired in a tunnel kiln or a periodic kiln, while being placed on a shelf plate. In order to prevent cracking of the structural body and bonding between the structural body and the shelf plate, underlying boards called setters are interposed between the green ceramic honeycomb structural bodies and the shelf plate during firing.

Japanese patent publication No. 1-54,636 discloses, as an example of the underlying board, a setter made of a ceramic plate with a honeycomb structure and having a burred portion at an upper edge. For example, when a honeycomb structural body composed mainly of cordierite is to be fired, it is a common practice to employ an underlying board made of the same material (100% cordierite) as that of the honeycomb structural body so as to make the shrinkage factor equal between the underlying board and the honeycomb structural body to be fired.

However, in the case of the above-mentioned underlying boards, problems arise as the number of times the board is passed through the tunnel kiln increases. Specifically, the underlying board is warped when heated, and the surface of the structural body becomes coarse due to melting-out of a silica component so that the bottom end face of the honeycomb structural body is deformed, ribs of the honeycomb structural body are twisted and/or the structural body is cracked. Particularly, if the underlying board made of 100% cordierite is used in a tunnel kiln, the above problems such as warping and melting-out of the silica component are conspicuous, because such an underlying board has poor resistance against direct flame from a burner of the tunnel kiln. Owing to this, the conventional underlying boards have the problem that the number of times of passing through the tunnel kiln may be as low as 15-20.

SUMMARY OF THE INVENTION

It an object of the present invention is to solve the above-mentioned problems, and to provide a firing underlying board which has a long service life free from thermal deformation and which does not cause twisting of ribs, deformation of end faces, cracking or color change in a honeycomb structural body on firing with use of the underlying board. It is another object of the invention to provide a method for firing ceramic moldings by using such an underlying board.

The firing underlying board according to the present invention is characterized in that a main component thereof is composed of 55-85 wt % cordierite and 15-45 wt % mullite. It is preferable that a roughness, Ra, of that surface of the underlying board on which an object to be fired is to be placed is not more than 10 μm. It is also preferable that the main component contains 0.3 to 1.0% by weight of $Fe_2O_3$ and/or 0.2 to 0.8% by weight of $TiO_2$.

The method for firing the ceramic molding by using the underlying board according to the present invention is characterized in that a green ceramic honeycomb structural body is fired in the state that the honeycomb structural body is placed on an underlying board for firing, in which a main component of the board is composed of 55-85 wt % cordierite and 15-45 wt % mullite.

In the above construction, the present inventors found out that when, for example, a green ceramic honeycomb structural body is fired with use of the underlying board in which the main component is composed of 55-85 wt % cordierite and 15-45 wt % mullite, the underlying board exhibits a long service life without being thermally deformed. Accordingly, twisting of the ribs, deformation of the end face and cracking in the honeycomb structural body due to thermal deformation of the underlying board can be prevented.

The reason why the amount of mullite is limited to 15-45 wt % is that if it is less than 15 wt %, the underlying board begins to be melted at not more than 1500° C., so that such an underlying board has unfavorably poor refractoriness in the case of firing with direct flame, whereas if the amount is more than 45 wt %, the underface of the honeycomb structure body unfavorably becomes whitish.

The reason why the surface roughness is preferably not more than 10 μm is that if the surface roughness is more than 10 μm, the ribs of the honeycomb structural body may be twisted at the lower end face due to shrinkage friction resistance on firing.

Further, the reason why the content of $Fe_2O_3$ is preferably 0.3 to 1.0 wt % in the chemical composition is that if the content is more than 1.0 wt %, the color of the underlying board may be changed to reddish brown, whereas if it is less than 0.3 wt %, an Fe component in the honeycomb structural body may diffuse into the underlying board having a low content of Fe. Consequently, the content of Fe in the honeycomb structural body decreases to make the honeycomb structural body whitish.

Furthermore, the reason why the content of $TiO_2$ is preferably 0.2 to 0.8 wt % in the chemical composition is that if the content is more than 0.8 wt %, the color of the lower end face of the honeycomb structural body may be changed to reddish brown, whereas if the content is less than 0.2 wt %, the $TiO_2$ component contained in the honeycomb structural body may diffuse into the underlying board having a low content of Fe so that the content of Fe in the underlying board decreases to make the honeycomb structural body whitish.

BRIEF DESCRIPTION OF THE DRAWINGS

FIG. 3 is a graph showing the relationship between the temperature at which the underlying board began to melt and the weight ratio of mullite in an Experiment.

FIG. 1 shows a flow chart illustrating an example of the process for producing the firing underlying boards according to the present invention. Bodies having raw materials each having a main component composed of 55-85 wt % of cordierite and 15–45 wt % of mullite after firing are formulated and mixed. Then, 3 wt % of water is added to the resulting mixture, which is kneaded with a mixer for 15 minutes to obtain a body. Next, the kneaded body is fed into a hydraulic press machine where the kneaded body is press molded under pressure of 400–800 kg/cm². Thereafter, the resulting molding is dried in a temperature range of 90°–100° C. for 4 hours, and fired in a temperature range of 1360°–1420° C. for one hour. Thereby, an underlying board according to the present invention is obtained.

The chemical composition of the underlying board is preferably 35–50 wt % of $SiO_2$, 40–55 wt % of $Al_2O_3$, 5–15 wt % of MgO, 0.3–1.0 wt % of $Fe_2O_3$, and 0.2–0.8 wt % of $TiO_2$. If the content of $Fe_2O_3$ exceeds 1.0 wt %, the bottom end face of the honeycomb structural body may become reddish brown. If the content of $TiO_2$ exceeds 0.8 wt %, similar color change may occur. Thus, it is preferable that the content of $Fe_2O_3$ is not more than 1.0 wt %, and that the content of $TiO_2$ is not more than 0.8 wt %.

Figure 1:
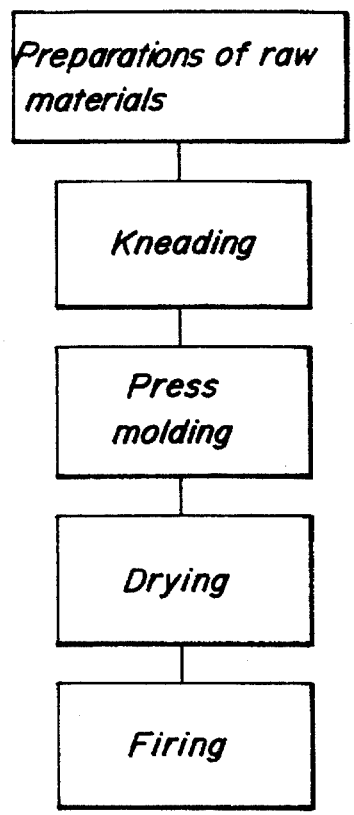
FIG. 1 is a flow chart illustrating steps of an example of a process for producing underlying boards according to the present invention.
Figure 2:
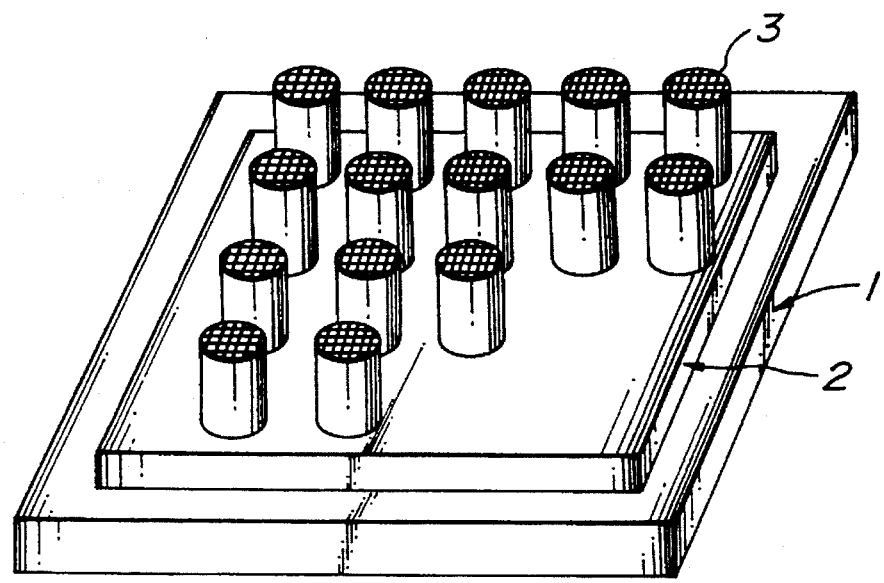
FIG. 2 is a view illustrating the state that green ceramic honeycomb structural bodies are fired with use of an underlying board according to the present invention.

When green ceramic honeycomb structural bodies are to be fired by using the underlying board according to the present invention, as shown in FIG. 2, the underlying board 2 of the present invention is placed on a shelf plate 1, and a plurality of green ceramic honeycomb structural bodies 3 are placed on this underlying board 2 such that through holes of the honeycomb structural bodies may be directed perpendicularly to the underlying board 2. The green ceramic honeycomb structural bodies 3 are fired in this state by using a firing a kiln such as a tunnel kiln or a period kiln according to a given firing condition.

BEST MODE FOR WORKING THE INVENTION

Experiment 1

Underlying boards were prepared for firing, according to the above-mentioned producing process with their compositions being varied as shown in the following Table 1. Molding pressure and bulk density of the underlying board were measured during the production thereof. Further, green ceramic honeycomb structural bodies were fired in a firing kiln with use of the thus prepared firing underlying boards. During or after the firing, color of contact faces of the honeycomb structural bodies with the underlying board, and the melted state of the underlying board with direct flame were observed visually. Further, the temperature at which the underlying board began to melt was examined. Results are also shown in Table 1. The relationship between the melting-starting temperature and the weight ratio of mullite are shown in FIG. 3.

From the results in Table 1, it is seen that when the content of mullite is 15 wt %, the temperature at which the underlying board begins to melt is not less than 1500° C. which may be employed as a safety temperature in the firing kiln (see line "S" in FIG. 3). Thus, heat resistance of the underlying board is enhanced. On the other hand, if the content of mullite exceeds 45 wt %, the color of the bottom end face of the honeycomb structural body at which the underlying board contacts unfavorably becomes whitish. Therefore, it is seen that when the content of mullite is 15–45 wt %, the underlying board exhibits sufficient heat resistance, and change in color of the fired honeycomb structural body to be fired does not occur.

As to the color change, it is presumed that an Fe component contained in the honeycomb structural body (which Fe component replaces a part of Mg) diffuses into the underlying board having a lower concentration of Fe, so that the bottom end face of the honeycomb structural body becomes whitish due to a decrease in the Fe concentration therein. That is, the ideal composition of cordierite is $Mg_2Al_4Si_5O_{18}$, but a part of Mg is substituted by $Fe^{2+}$ ions in natural origin in many cases. This Fe component in the raw material ordinarily makes the honeycomb structural body milky whitish after the firing, but the color change is caused through the decolorization due to decrease in the Fe concentration.

Experiment 2

In order to examine the fired state of the ceramic honeycomb structural bodies fired with use of the underlying boards of the present invention, green ceramic honeycomb structural bodies were actually fired by using the firing underlying boards of the present invention or a setter disclosed in Japanese patent publication No. 1-54,636 each having the composition and various physical properties shown in Table 2, and product qualities of fired honeycomb structural bodies as well as qualities of the underlying boards were examined. In evaluating the product qualities, whether the honeycomb structural body cracked or not was examined visually, and a difference in dimension between upper and lower end faces of the structural body and a recessed amount in the central portion thereof were measured. In evaluating the qualities of the underlying board, whether deformation, cracking and/or color change occurred or not were examined visually. Results are also shown in Table 2.

TABLE 1

| Sample No. | 1 | 2 | 3 | 4 | 5 | 6 | 7 | 8 | 9 |
|---|---|---|---|---|---|---|---|---|---|
| Cordierite (wt %) | 100 | 90 | 85 | 75 | 65 | 55 | 50 | 25 | 0 |
| Mullite (wt %) | 0 | 10 | 15 | 25 | 35 | 45 | 50 | 75 | 100 |
| Molding pressure (t/cm²) | 0.5 | 0.5 | 0.5 | 0.5 | 0.5 | 0.5 | 0.5 | 0.5 | 0.5 |
| Bulk density (g/cm³) | 1.60 | 1.67 | 1.83 | 1.83 | 1.90 | 1.94 | 1.97 | 1.19 | 1.2 |
| Color of contact face of honeycomb | not changed | not changed | not changed | not changed | not changed | not changed | whitish | whitish | whitish |
| Melted state when heated directly with flame | greatly melted | not so melted | slightly melted | slightly melted | slightly melted | slightly melted | slightly melted | not melted | not melted |
| Temperature at which melting occurred (°C.) | 1440 | 1480 | 1510 | 1560 | 1580 | 1600 | 1600 | 1650 | 1700 |

TABLE 2

| Sample No. | | Example 1 | Example 2 | Example 3 | Example 4 | Example 5 | Example 6 | Example 7 | Comparative Example |
|---|---|---|---|---|---|---|---|---|---|
| Physical properties | Cordierite (wt %) | | 85 | | 65 | | 55 | | 100 |
| | Mullite (wt %) | | 15 | | 35 | | 45 | | 0 |
| | Maximum grain diameter of mullite (μm) | 250 | 500 | 1000 | 500 | 1000 | 500 | 1000 | — |
| | Apparent porosity (%) | 25.7 | 21.8 | 22.3 | 24.1 | 23.8 | 15.7 | 21.4 | 35 |
| | Bulk density (g/cm$^3$) | 1.94 | 2.04 | 2.04 | 2.02 | 2.01 | 2.29 | 2.15 | 0.45 |
| | Bending strength R.T (kg/cm$^2$) | 207 | 303 | 209 | 274 | 183 | 267 | 144 | — |
| | 1000° C. | 347 | 379 | 455 | 446 | 347 | 493 | 361 | — |
| | Surface roughness Ra (μm) | 1.9 | 4.7 | 5.9 | 4.0 | 5.4 | 5.5 | 5.4 | — |
| Test results | Qualities of product | Cracking | not cracked | not cracked | not cracked | not cracked | not cracked | not cracked | not cracked | slightly cracked |
| | | Difference in dimension between upper and lower ends (mm) | 0.2 | 0.2 | 0.3 | 0.2 | 0.3 | 0.3 | 0.3 | 0.7 |
| | | Recessed amount in central portion (mm) | 0.2 | 0.2 | 0.3 | 0.2 | 0.3 | 0.3 | 0.3 | 0.5 |
| | Qualities of underlying board | Deformation | not deformed | not deformed | not deformed | not deformed | not deformed | not deformed | not deformed | slightly deformed |
| | | Cracking | not cracked | not cracked | not cracked | not cracked | not cracked | not cracked | not cracked | not cracked |
| | | Color change | not color-changed | not color-changed | not color-changed | not color-changed | not color-changed | not color-changed | not color-changed | not color-changed |

From the results in Table 2, it is seen that as compared with the underlying boards of the Comparative Examples, the underlying boards according to the present invention had smaller thermal deformation, and that when the green ceramic honeycomb structural bodies were fired by using the underlying boards of the present invention, the color of the bottom end faces of the honeycomb structural bodies did not change.

Experiment 3

In order to examine influence of the surface roughness of the underlying boards of the present invention, green ceramic honeycomb structural bodies were actually fired by using underlying boards of the invention with their compositions and various surface roughnesses as shown in Table 3. As product qualities of the fired honeycomb structural bodies, twisting of ribs and color change in the honeycomb structural bodies were examined visually. Results are also shown in Table 3.

TABLE 3

| Sample No. | | 1 | 2 | 3 | 4 | 5 | 6 |
|---|---|---|---|---|---|---|---|
| Cordierite (wt %) | | 65 | 65 | 65 | 55 | 55 | 55 |
| Mullite (wt %) | | 35 | 35 | 35 | 45 | 45 | 45 |
| Surface roughness (μm) | | 2.6 | 10.0 | 12.3 | 5.5 | 11.0 | 15.7 |
| Qualities of product | Twisting of rib | not twisted | not twisted | twisted | not twisted | twisted | twisted |
| | Color change | not color-changed | not color-changed | not color-changed | not color-changed | not color-changed | not color-changed |

From the results in Table 3, it is seen that since the ribs are twisted at the lower end face of the honeycomb structural body due to friction resistance in shrinking at the time of firing if the surface roughness, Ra, exceeds 10 μm, the surface roughness Ra is preferably not more than 10 μm. The surface roughness can be adjusted by varying the grain sizes of cordierite and/or mullite.

Experiment 4

In order to examine influence of the content of $Fe_2O_3$ in the underlying boards of the present invention, actual color changes in green ceramic structural bodies were examined visually when the content of $Fe_2O_3$ was varied in various ways in underlying boards in which the crystalline phase was composed mainly of 65 wt % of cordierite and 35 wt % of mullite. Results are shown in Table 4.

TABLE 4

| Sample No. | 1 | 2 | 3 | 4 | 5 | 6 |
|---|---|---|---|---|---|---|
| $Fe_2O_3$ (wt %) | 0.2 | 0.3 | 0.5 | 0.8 | 1.0 | 1.2 |
| Color | color | no | no | no | no | color |

TABLE 4-continued

| Sample No. | 1 | 2 | 3 | 4 | 5 | 6 |
|---|---|---|---|---|---|---|
| change | changed (whitish) | color change | color change | color change | color change | changed (reddish brown) |

From the results in Table 4, it is seen that the content of $Fe_2O_3$ is preferably 0.3 to 1.0 wt %, because the color of the ceramic honeycomb structural bodies fired by using the underlying boards containing $Fe_2O_3$ in this range did not change.

Experiment 5

In order to examine influence of the content of $TiO_2$ in the underlying boards of the present invention, actual color changes in green ceramic structural bodies were examined visually when the content of $TiO_2$ was varied in various ways in underlying boards in which the crystalline phase was composed mainly of 65 wt % of cordierite and 35 wt % of mullite. Results are shown in Table 5.

TABLE 5

| Sample No. | 1 | 2 | 3 | 4 | 5 | 6 |
|---|---|---|---|---|---|---|
| $TiO_2$ (wt %) | 0.1 | 0.2 | 0.4 | 0.6 | 0.8 | 1.0 |
| Color change | color changed (whitish) | no color change | no color change | no color change | no color change | color changed (reddish brown) |

From the results in Table 5, it is seen that the content of $TiO_2$ is preferably 0.2 to 0.8 wt %, because the color of the ceramic honeycomb structural bodies fired by using the underlying boards containing $TiO_2$ in this range did not change.

Industrial Applicability

As is clear from the above explanation, according to the present invention, since the main component of the underlying board is composed of 55–85 wt % of cordierite and 15–45 wt % of mullite, as compared with the conventional underlying boards such as setters, heat resistance is improved, deformation of the bottom end face, twisting of the ribs and cracking in the honeycomb structural body due to thermal deformation of the underlying boards and/or melting-out of silica can be suppressed. Furthermore, the green ceramic honeycomb structural body can be fired without causing any deformation of the bottom end face of the honeycomb structural body. As a result, the service life of the underlying board can be prolonged as compared with the conventional setters. In addition, the number of the steps in the production of the underlying board of the present invention can be largely reduced as compared with that in the production of the conventional setters.

We claim:

1. A firing underlying board consisting essentially of a crystalline phase including 55–85 wt % cordierit and 15–45 wt % mullite, wherein the chemical composition of said crystalline phase comprises 0.3–1.0 wt % $Fe_2O_3$.

2. The firing underlying board of claim 1, wherein a roughness, Ra, of that surface of the underlying board on which an object to be fired is to be placed is not more than 10 microns.

3. A method for firing a green ceramic molding by using an underlying board, said firing being effected in a state that the molding is placed on said firing underlying board recited in claim 1.

4. A firing underlying board consisting essentially of a crystalline phase including 55–85 wt % cordierite and 15–45 wt % mullite, wherein the chemical composition of said crystalline phase comprises 0.2 to 0.8 wt % $TiO_2$.

5. The firing underlying board of claim 4, wherein a roughness, Ra, of that surface of the underlying board on which an object to be fired is to be placed is not more than 10 microns.

6. A method for firing a green ceramic molding by using an underlying board, said firing being effected in a state that the molding is placed on said firing underlying board recited in claim 4.

* * * * *

UNITED STATES PATENT AND TRADEMARK OFFICE
CERTIFICATE OF CORRECTION

PATENT NO. : 5,529,732
DATED : June 15, 1996
INVENTOR(S) : Yoshiaki IDEGUCHI, Kyosuke TSUNEKAWA and Norio KATO It is certified that error appears in the above-indentified patent and that said Letters Patent is hereby corrected as shown below:

On the Title page, column 1, [86], line 2, change "§371 Date: Sep. 12, 1994" to --§371 Date: Sep. 21, 1994--.

Signed and Sealed this

Third Day of September, 1996

Attest:

BRUCE LEHMAN

Attesting Officer

Commissioner of Patents and Trademarks